Aug. 16, 1966  R. J. OSBORNE ETAL  3,266,559
METHOD OF DRYING FOAMED MATERIALS, E.G. FOODS
Filed Feb. 15, 1963

ROBERT J. OSBORNE
NORMAN N. POTTER
JOSEPH V. FIORE
THOMAS K. KELLY
INVENTORS.

BY Arthur J. Plantamura
ATTORNEY.

United States Patent Office 3,266,559
Patented August 16, 1966

3,266,559
METHOD OF DRYING FOAMED MATERIALS, E.G. FOODS
Robert J. Osborne, Fairfield, Norman N. Potter, Stamford, and Joseph V. Fiore and Thomas K. Kelly, Fairfield, Conn., assignors to American Machine & Foundry Company, a corporation of New Jersey
Filed Feb. 15, 1963, Ser. No. 258,807
9 Claims. (Cl. 159—49)

This invention relates to the drying of materials in a foamed state and more particularly to an improved method and apparatus for the expeditious dehydration of foams to produce a product of superior quality.

Dehydration of foamed foods as a means of solving various problems associated with preservation, convenience, storage, transportation, etc., has been a recognized procedure for many years. The technique described in U.S. Patents 2,183,516 and 2,200,963 is illustrative. In more recent years, various approaches are described in such U.S. Patents as 2,934,441, 2,955,046, 2,955,943, 2,967,109, 2,976,158, 2,981,629, and 3,031,313.

It is the object of the present invention to provide improvements in the dehydration of comminuted materials which are suspended in a foamed medium.

It is a more specific object of the invention to provide a foam dehydration method which very significantly expedites the drying rate thereby lending improved commercial significance to foam material drying.

It is a further object of the invention to provide improved apparatus useful in the dehydration procedure of foamed material.

It is another object of the invention to provide, in the art of dehydrating foamed material, a method for controlling the uniformity of the product and producing material of improved quality.

Various additional objects of the invention will become apparent from the description which follows.

The invention will be described herein in connection with the drying of food foams and generally in connection with aqueous systems, but it will be apparent that the invention may be applied, in addition, to the drying of non-food material and/or from non-aqueous systems with the objective that the availability of such non-food material in a relatively dehydrated state is advantageous.

Generally in the method of dehydrating foamed food material a procedure is employed wherein a suitable food concentrate, usually in the form of an aqueous slurry, is prepared and a gas, usually air, is then incorporated into the slurry, as by whipping, resulting in a rather stiff foam. Conversion of the food into the foam state, and the stability thereof is usually aided by the introduction of an edible foam stabilizer. The foam is then appropriately deposited, as by casting or extrusion, onto a drying surface, for example a stainless steel belt, and thereafter it is appropriately dried until a moisture level usually in the range of below about 10% and more practically in the range of about 1 to 5% is reached. The dried foam removed from the drying surface may then be flaked or ground and, where desirable, may be compressed into pellets or other forms without significant loss of the property of ease of solubility in cold water.

Heretofore it has been customary to dry foams in relatively thick layers, usually thicknesses in excess of ⅛ inch. Layers of this depth have required drying periods in the order of 15 to 30 minutes, and longer with many products. This relatively long drying period had detracted significantly from greater commercial utilization of this technique. We have found that by careful control of a combination of conditions including foam layer thickness, underside heating of the support surface or belt, drying air temperature, velocity of air and direction of flow of air, each of which conditions among others, will hereinafter be considered in greater detail, a superior product is derived. By drying in accordance with the invention, drying periods have been reduced to less than one-fourth the time heretofore generally required and with some products less than one-tenth the period heretofore required for drying like amounts of the same materials.

The invention will be described in conjunction with the accompanying drawing in which.

Figure 4:
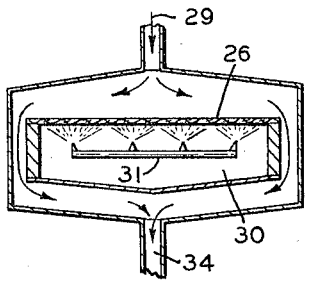
FIG. 4 is a view similar to FIG. 3 showing an alternate embodiment.

Referring to the drawing, suitable food emulsion or suspension 10 in a suitable concentration, generally about 20% to 60% solids is introduced together with a foam stabilizing emulsion 12 through lines 11 and 13, respectively, into the mixing vessel 14. The mixture prepared in vessel 14 is thereafter fed through line 15 into a foam generating apparatus 18 where air or other suitable gas is incorporated, as by beating, into the liquid mix by an appropriate mechanism, such as the impeller arrangement 19, until a substantially rigid foam, in which the comminuted material to be dried is suspended, is produced. The foam prepared in this, or other suitable, manner, is continuously fed onto an endless belt 26 as by casting a layer in thicknesses which are generally kept below about 100 mils and preferably thicknesses between about 5 and 40 mils.

The foam fed from the foam generator through line 20 is deposited by means of a suitable casting assembly 22 onto the endless surface 26. The surface 26 preferably comprises an impervious metal belt of stainless steel. The belt 26 is suitably supported at 23 and 24 and driven in a conventional manner as by driving one of the supports 23 or 24 in an appropriate manner as by belt connection to a drive motor (not shown). The foam layer is carried by the conveyor 26 through the areas 28 which may be enclosed from the surrounding space and where drying occurs and moisture is reduced to about 1 to 10%. The belt 26 is provided with a heating arrangement which may comprise one or more steam boxes 30 to heat the underside of the belt 26. This under belt heating means preferably comprises a plurality of units as shown, in which each steam box unit may be separately regulated as to heat input although a single unit may extend the length of the belt which it is desired to heat. Preferably, the steam box arrangement employed comprises steam impingement units 31 into which steam is fed at 32 so as to impinge against, and condense steam on, the underside of the belt. Optionally, the steam may be mixed with air as through the air feed line 33 or by means of a conventional eductor, and then the mixture is impinged against the belt underside. In the utilization of steam admixed with air, the air, introduced into the steam, is utilized to control the temperature of the steam in a given zone thereby permitting drying at lower temperatures which may vary, for example, over the range of from about 140° F. to about 212° F., using steam at normal atmospheric conditions. This concept offers an important advantage in the utilization of atmospheric steam while providing optimum control over a wide range of temperatures.

Drying of the product is further aided by the utilization of a relatively high velocity, hot air stream 29 over the product in the hood arrangement 37. We have found that an important advantage in accelerating drying resides in conducting the drying material in the drying line through a series of zones into which a relatively high velocity drying gas or air is fed. The gas or air in these zones, three of which are shown as 61, 62, 63, is introduced in a direction transverse to the movement of the foam material on the conveyor. It will be apparent that additional zones are contemplated depending on the apparatus used, the material in question to be dried, the temperature conditions desired, etc. The moisture laden air passing transversely over the product is exhausted below the belt surface at 34 from the sides of conveyor 26 as shown more clearly in FIG. 4. Alternately, exhaustion of drying gas passed over the foam layer may be effected by the system illustrated in FIG. 3 through the exhaust outlet 35 situated above the drying surface. This moisture laden air may be exhausted outside of the drying environment or, if desired, freed of its moisture and recirculated into the feed line 29 to conserve the heat content of the air or other gas which may be employed in lieu of air. The steam impingement arrangement may be of the type disclosed in the pending application of R. C. Geitz, S.N. 144,600, filed on October 12, 1961, now abandoned. The belt heating unit is such as to provide a belt temperature generally between about 140–212° F. Preferably, the temperature at the upper surface of the belt is maintained between about 150–195° F. After a suitable period of drying the product containing relatively low moisture content in the range of about 1–4%, preferably 2–3%, is doctored at 40 and conveniently collected as by conveying through the hopper 41 and through the conveyor arrangement 42 to product packaging and storage facility 43.

For certain products it may be desirable to utilize inert drying gas in lieu of a portion or all of the drying sequence. This may be effected, for example, by introducing an inert or desiccated gas or special treating gas into the last of the three chambers 63 only or into two or more of the plurality of such gaseous treating units.

Figure 1:
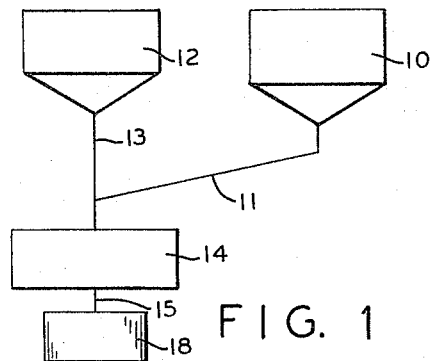
FIG. 1 illustrates, by flow diagram, the various steps employed in the process and in which one form of drying comprising a series of under belt steam boxes and over belt zones arrangement is shown.
Figure 2:
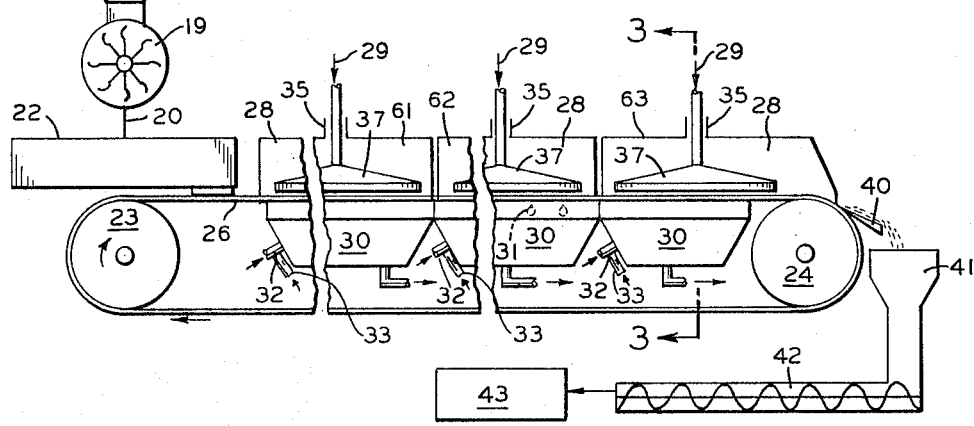
FIG. 2 illustrates a modified arrangement in which the dryer is provided with a supplemental drying zone or tunnel on the return strand of the endless conveyor.

As shown in the alternate embodiment of FIG. 2 of the drawing, the endless conveyor comprises an arrangement in which the return path or strand of the conveyor may be utilized in the drying of the product by situating a tunnel dryer as shown at 52. The advantage of an arrangement of this type resides in the abbreviated length of the apparatus especially with respect to the drying of certain products. If the complete drying were to be effected in a straight line the dryer would obviously require a longer and more costly unit. In using the arrangement of FIG. 2, drying gas at a suitable temperature is introduced into and withdrawn from tunnel 52 at 53 and 54, respectively. The product is doctored at 55 and collected at 56. The return strand tunnel dryer may be used in connection with the arrangement of one or more elements employed in FIG. 1 or independent thereof.

In general, the entire drying operation, from the time the material is cast on the belt until it is doctored off the conveyor support surface, is effected in less than 5 minutes. Preferably, drying is accomplished in less than 3 minutes. This time depends upon the product being dried and the selected temperature zones chosen both below and above the belt for optimum drying.

While it may be expected that as the film thickness is decreased, the loading per unit area would be decreased and the productivity of a drying unit would be reduced, we have found that not only is productivity not reduced, but indeed, it is substantially increased (by a factor of at least 2 in going, for example, from an 80 mil film to a 30 mil film). Productivity increase arises from the fact that the drying time to 3% moisture decreases much more rapidly than the film thickness. As an illustration, the time to dry an 80 mil film under certain thermal conditions may be 16 minutes. Under the same thermal conditions, a 30 mil film will be dry in 3 minutes. Thus, although the film thickness has been decreased by a factor of 2.65, the drying time has been reduced by a factor of 5.32. In addition to the advantage of increased productivity, there is the very definite advantage of reduction in damage to the product resulting from exposure of thin films to the hot drying temperature for a markedly shorter time. This will be illustrated in the examples provided hereinafter. Moreover, since the fast drying thin films can be effectively dehydrated at temperatures below the atmospheric boiling point of water, boiling will not occur in the film and the foam structure will not be substantially disrupted or collapsed.

In the present invention drying is preferably effected by impingement of steam on the underside of the drying surface. When steam is impinged on the belt, heat transfer is substantially enhanced. It appears that the impinging steam penetrates through the surface condensate barrier which retards efficient transfer of heat to the belt.

Advantages of steam impingement drying reside in the fact that highest possible heat transfer rates consistent with an unscorched product are possible. This is effected by feeding steam into the steambox at temperatures not in excess of about 225° F. and further controlling the temperature of the belt by admixture of air with the feed steam.

It is known that high rates of heat transfer may be obtained by the condensation of steam on clean surfaces. However, it steam is allowed to condense on the underside of a moving conveyor a layer of water is accumulated on the condensing surface, and the rate of heat transfer is no longer controlled by the rate of steam condensation, but rather by conduction of heat through the water film. This is a much slower process than the transfer of heat by condensation. If a noncondensable gas (such as air) is present, the heat transfer rate is reduced even below that of a film of water since a low-conductivity vapor film is present. However, we have found that if the heat transfer vapor (steam or a steam-air mixture) is directed at the condensing surface at a high velocity, high heat transfer rates can be obtained throughout the whole length of the steambox dryer. This velocity can be obtained by the use of spray nozzles, small orifices in a header pipe, or the like. It appears that the high velocity vapor stream scrubs the belt and thereby removes any adherent film or barrier interfering with the rapid transfer of the heat which is required for efficient evaporation.

In conjunction with steam condensation on the underside of the belt we employ high velocity heated air or gas over the product in the initial drying stage. While air is generally referred to in the description it will be understood that other suitable gases are also contemplated. Ambient air has been used normally in the past with underbelt steam dryers at times coupled with exhaust systems. We have found that the drying rate is unexpectedly improved when a hot air mass is forced over the drying product at a high velocity. The increase in initial drying rate when using high velocity gases is better than two-fold. The hot air mass forced over the foam layer has a velocity of up to about 2500 ft./mi. and it may be even greater in some zones; preferably, it is in the range of between about 1000 and 2000 ft./min. Temperatures may vary from ambient temperature to about 220° F.; preferably the temperature is maintained between about 140–200° F.

Figure 3:
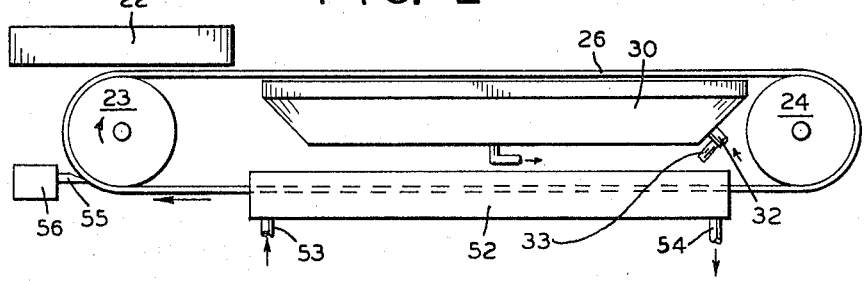
FIG. 3 is a sectional view taken along line 3—3 of FIG. 1.

An important aspect of the present invention resides in the manner in which the heated air is applied to the surface of the foam layer under dehydration. The present invention applies the hot air or gas so that it flows in a direction transverse to the direction of travel of the endless surface carrying the foam material. Control of air applied in this manner is enhanced and is more efficient and less costly than arrangements described in the prior art. Normally in the prior art, air is applied in a co-current or counter-current direction to the direction of travel of material being dried on conveyor surfaces. In accordance with the transversely applied air stream arrangement set forth by the teachings of this invention, air is applied at the center of the belt and exhausted at the sides as illustrated in FIG. 3 and alternately in FIG. 4. It will be apparent additionally that the direction of the hot air or gas may be reversed and introduced at the sides of the belt and withdrawn at the center. The moisture removal of the drying gas applied transversely, e.g. as shown in FIGS. 3 and 4 is exceptionally effective and in view of its short contact time with the drying material, permits utilization of substantially less severe temperatures since the gas need not become saturated with solvent vapor. In order to afford precise control and provide means, where desirable, of using an inert gas, the hot gas applied to the drying foam may be effected in a plurality of zones. Thus, for example, in FIG. 1, increasingly hotter gases, with variable humidity and increasingly higher velocities may be introduced to the drying surface in zones 61 and 62, respectively. In zone 63, final treatment with an inert gas may be used just prior to, or coincidental with, removal of the product from the drying surface.

The air velocity has a significant effect on the rate of evaporation of water from the surface of the film. We have found that in general, doubling the air velocity will provide a 75% increase in the evaporation rate. However, at velocities above about 2500 ft./min. the foam may be blown from the belt and it is preferred therefore to operate at velocities below this value. Furthermore, it is possible to remove heat (by loss to the cold air and in the form of heat of vaporization of the water) from the exposed surface of the film faster than it can be transmitted through the film (which, being a foam, tends to be an insulator). If this happens, the surface temperature of the film will decrease. Such a decrease will result in a rapid drop of the vapor pressure of water at the surface of the film with a resulting decrease in the evaporation rate. Therefore, heat is supplied to the air to prevent cooling of the surface of the film. Surprisingly, it appears that the primary function of preheating the air is to prevent loss of sensible heat to the cold air rather than to provide heat of vaporization. This arises from the fact that the air temperature does not drop in passing through the dryer, as it would if it were giving up heat, even though the rate of evaporation improves markedly upon heating the air.

The desired air temperature depends on the product being dried. The upper limit is determined by thermal sensitivity of the material. The lower limit is determined by the drying characteristics of the material and, for some non-hygroscopic, easily dried materials, use of ambient air may suffice.

As described in conjunction with the figures of the drawing, the product after it has traversed the steam impingement and high velocity air unit 28 has a residual moisture content of less than 20%. The drying of the product may be continued on the arrangement described, that is, by extending the length of the steam impingement unit under the belt and the high velocity air units above the drying material. Because of the relatively high cost of this arrangement, however, it may be preferred that this product with low moisture content be further dried by more conventional means which uses air alone in contact with the product if the product is one which dries slowly. This air drying unit which follows the steam impingement, high velocity section may be in linear arrangement therewith although because of the undue length which would result, it may be desirable that the air oven dryer unit be positioned on the return strand of the conveyor as shown in FIG. 2. As indicated previously, the gas employed in this final oven to take the product through its falling rate period to a moisture of about 1–4% may be air or any of the commonly employed inert gases, or in the case of highly hygroscopic products may be a predesiccated gas. With some products a highly dehydrated state is advantageous or is required to make the product commercially attractive. In such cases the substantially dried material may be "rewetted" with an azeotroping agent such as ethyl alcohol in the case of a water soluble product and re-dried thereby removing substantially most of the residual water. This technique is further illustrated in Example 32.

The material to be dried which is cast on the belt should preferably be in the form of a stable foam. To prepare a stable foam from the liquid to be dried it is generally required that the liquid have sufficient body to retain incorporated gas. In most cases this requirement is met when the liquid contains so much suspended and/or dissolved solids that it has a thick consistency like that of a syrup, sauce, or paste. Thus, depending on the character of the liquid, it may be necessary to concentrate or thicken it by evaporation of water or other conventional techniques. For example, ordinary juices such as orange juice and tomato juice are too thin to form stable foams, accordingly, the juices are first concentrated to a level of at least 20% solids or more and, preferably, to the extent that such liquids have a syrup-like or pasty consistency. Milk is another example of a substance which for best results needs to be concentrated prior to foaming it. In cases where the liquid is to be increased in body, this is generally accomplished by removal of water. However, other techniques can be used in place of, or in conjunction with water removal. For example, the consistency of juices, purees, and the like, can be increased by the addition of bodying agents such as dextrins, pectin, algin, or other natural or synthetic gums. Other materials such as molasses, honey, corn syrup, starch pastes, egg yolk, whole egg and the like, already have sufficient body so that no increase in solids content is needed. Moreover, some materials may require dilution with water to give them proper fluid characteristics. For example, in applying the process to such relatively high-viscosity materials as pulped raisins, dates, figs, mashed cooked potatoes, or the like, this addition of some water to the pulp may enable it to flow more readily and make it more adaptable for the incorporation of a gas to prepare a foam. There are still other cases of natural foam forming materials, such as egg white, and various protein solutions which are of comparatively low viscosity yet will foam without further concentration. Some of these materials are also useful foam adjuncts and foam stabilizers when combined with other food materials.

In preparing the foam, the gas is incorporated into the liquid by conventional techniques. Although air is conveniently used, any gas compatible with the desired result may be substituted. In preparing edible products, non-toxic gases are used such as air, nitrogen, carbon dioxide, nitrous oxide, helium, propane, n-butane, isobutane, dichlorodifluoromethane, trichloromonofluoromethane, or monochlorotrifluoromethane. Incorporation of the gas into the liquid may be accomplished in any of the conventional methods used, for example, in aerating ice cream, salad dressing, etc. A simple method where air is to be incorporated is to whip the liquid with a rotating wire whip which beats air into the mixture. For best results, it is preferred that the gas bubbles be dispersed uniformly through the foam and be of uniformly small size, i.e. about 100 microns or less in diameter. Modern high shear continuous foamers which incorporate gas into the food concentrate under pressure tend to increase uniformity and decrease the size of the gas bubbles. Also, the mixture may be cooled during the foaming operation to promote formation of a stable foam. Where cooling is used, any temperature below room temperature may be applied provided it is not low enough to freeze the foam.

In many instances, it is not feasible to form a stable foam by incorporation of gas alone into the liquid. In these situations, a minor proportion of a foam-stabilizing agent is introduced. The chemical nature of the foam-stabilizing agent is not critical to the operability of the invention as long as the agent is compatible and has the ability to stabilize the foam in question. The proportion of foam-stabilizing agent will vary depending on the properties of the liquid, the properties of the particular agent employed, etc. In general, the proportion of the agent introduced to effect stability may vary from about 0.1 to about 5.0% by weight based on the weight of solids in the liquid. Generally the lowest proportion of foam-stabilizing agent compatible with the production of a stable foam is used. In any particular case, pilot trials may be conducted with different proportions of stabilizing agent noting the stability of the foam after incorporation of gas. The stability of the foams may best be determined by casting small quantities on the belt and conveying them through the drying zones at dehydration temperatures. A suitably stable foam is one which is characterized by substantial retention of its casting height throughout its dehydration. In a less severe test, such foams substantially retain their volume without separation of gas or liquid for at least ½ hour, preferably at least one hour, when allowed to stand at room temperature.

The foam stabilizer may be a surface active agent or a hydrophilic colloid or a mixture of the two. A wide variety of foam stabilizers known in the art may be used including those disclosed for example in U.S. Patent 3,031,313. Some particularly effective stabilizers with various products are given in the appended examples.

The amount of gas incorporated into the liquid may be varied widely. It has been found over a range of foam densities, that the greater the foam volume (i.e. the lower the density) of a given product the greater is the drying rate and the greater is the productivity of a drying unit under fixed conditions of film thickness and temperature profile. This apparently is due to a much increased water vapor mass transfer rate through the increased surface area and thinner cell walls of lower density foams. It therefore is advantageous to use the lowest foam density consistent with dehydrated product quality. However, it has been found that the lower the foam density, the lighter will be the resultant product color. For this reason it is preferred to use foam densities of 0.2 to 0.7 gm./cc. with highly colored materials in order to obtain maximum color retention. This apparent loss of color is not associated with chemical changes but has been found due to a scattering of light by the entrained gas. Upon reconstitution and heating these materials (to expel air), the original colors are largely returned.

It is also evident that the lighter the foam density the more bulky will be the final product because of a greater proportion of volume of voids to total volume. In some cases it may not be desired to produce a too-bulky end product (because of increased packaging costs) and in such case, the foam volume increase may be limited, say, to not over 5 times. However, if bulk and color of the final product is not a consideration, the foam volume increase may be as much as desired, up to, say 10 or 20 times the original volume of the liquid. It is evident from the above that the volume increase achieved in foaming may be varied widely depending upon the starting material and the characteristics desired in the final product.

A wide variety of products may be dried in accordance with the invention including purees, pastes, concentrates, juices of fruits and vegetables such as orange, grapefruit, lemon, lime, apple, pear, apricot, strawberry, raspberry, pineapple, grape, prune, peach, plum, cherry, tomato, celery, carrot, spinach, cabbage, potato, sweet potatoes, watercress, etc. Meat and fish products may be dehydrated including macerated meats and meat emulsions, such as beef, pork, veal, lamb, chicken, fish or shellfish, meat extracts, meat juices, soups or broths made from meat or fish, clam juice, oyster stew, fish or clam chowders, etc. Lacteal products that may be dried include whole milk, buttermilk, skim milk, whey, cream, yogurt, cheeses, milk products containing flavorings such as chocolate, cocoa, sugar, malt and the like. Cereal products include pastes of rice, wheat, barley, malted barley, corn, oats, extracts of grains or slurries of finely-divided cereal material. Beverages includes aqueous extracts of coffee, tea, chocolate, roasted cereal products (simulated coffee products) etc. Carbohydrate substances include honey, maple syrup, corn syrup, sorghum syrup, malt syrup, molasses, syrups obtained from the saccharification of wood, cotton linters or other cellulosic materials. Dispersions, which include true solutions, colloidal solutions, or suspensions of sucrose, dextrose, invert sugar, fructose, maltose, lactose, dextrins, dextrans, starches, natural gums, such as tragacanth, acacia, arabic, locust bean, karaya, carrageen, pectins, algins, etc., synthetic gums such as methyl cellulose, carboxymethyl cellulose, carboxymethyl amylose, carboxymethyl amylopectin, etc., may be dried. Egg products include egg white, egg yolk, whole egg or preparations of egg with other foods such as milk or cream, custard or salad dressing preparations. Miscellaneous products include gelatin, gluten, solutions of protein or protein hydrosates, solutions of sorbitol, mannitol, citric acid, tartaric acid, etc. Vitamin preparations such as solutions of ascorbic acid, thiamin or other vitamins, vitamin concentrates or vitamin precursors as well as biological products such as yeast, mushroom mycelium, microbial cultures, bacterial enzyme preparations, etc., may be dried utilizing the invention.

The invention and its various advantages are further illustrated by the examples which follow:

EXAMPLE 1

Commercial tomato paste, of 30% solids was blended with a 3% aqueous solution of polyglycerol stearate (available as Emcol-18 from Witco Chemical Company, New York, New York) to give 0.75% of the foam stabilizer based on tomato paste solids. This mixture, at 50° F. was whipped in an upright mixer with wire whip planetary agitator to a foam density of 0.52. The resulting foam was cast onto the moving belt at a foam bed thickness of 25 mils. The foam deposited on the stainless steel belt was dried by passing through the steam box high velocity heated air drying unit of the kind described in conjunction with FIG. 1. The belt entering the steam box zone was below 100° F., and emerged from the steam box zone at 190° F. This temperature was achieved by condensing steam on the bottom of the belt. High velocity, heated air at about 1500 ft./min. was blown transverse to the direction of belt movement down on the material at the center of the belt and exhausted at the sides. The product was dried to 3% moisture in a residence time of 60 seconds. Under these conditions, a rate of 1.0 lb. of dried product per square foot of dryer area per hour was obtained. The dehydrated product was continuously doctored from the moving belt. The tomato powder was of high, uniform quality, which could be readily reconstituted in hot or cold water and possessed typical tomato taste, color and aroma.

EXAMPLES 2, 3, 4 AND 5

A summary of Examples 2, 3, 4 and 5 is presented in Table A. The general procedure of Example 1 was followed with the exceptions noted. In this series of drying runs, the high velocity air blown across the belt above the tomato paste was not heated, instead air at ambient temperature was employed. All heat was supplied by steam impingement on the underside of the belt. The results obtained illustrate the effect of varying the foam layer thickness deposited on the drying surface. At decreasing foam layer thicknesses and at belt temperatures of about 190° F. the residence times become extremely short. This contributes to superior product quality without scorched flavor, in addition to the advantage of high production rates.

Substantial additional increase in production rates is obtained by superimposing heated high velocity air flow over the belt carrying these thin foam layers, as illustrated in subsequent examples.

EXAMPLES 10, 11, 12 AND 13

The general procedure for examples, summarized in Table C, is similar to the proceeding examples with the exceptions noted. In this series an air-steam mixture is used in the steam box, but is impinged against the

*Table A*

| Example | 2 | 3 | 4 | 5 |
|---|---|---|---|---|
| Product | Commercial Tomato Paste. | Commercial Tomato Paste. | Commercial Tomato Paste. | Commercial Tomato Paste. |
| Product Solids, Percent | 30 | 30 | 30 | 30. |
| Foam Stabilizer | Myverol 18-00* | Myverol 18-00* | Myverol 18-00* | Myverol 18-00*. |
| Foam Stabilizer, Percent Based on Product Solids. | 0.85 | 0.85 | 0.85 | 0.85. |
| Foam Density, gm./cc | 0.56 | 0.58 | 0.57 | 0.54. |
| Mixer | Upright | Upright | Upright | Upright. |
| Foam, Ht, mils | 5 | 15 | 30 | 45. |
| Dryer Designation | Steam Box | Steam Box | Steam Box | Steam Box. |
| Drying Conditions: | | | | |
| a. Steam Press. (steam box) | 7 p.s.i.g | 5 p.s.i.g | 5 p.s.i.g | 5 p.s.i.g. |
| b. Air Temp., °F. (above belt) | 85 | 85 | 85 | 85. |
| c. Belt Temp., °F | 195 | 195 | 195 | 195. |
| Residence Time, sec | 15 | 60 | 140 | 400. |
| Pounds Dry Product/(ft.²) (hr.) | 1.8 | 0.85 | 0.57 | 0.30. |

*Mixed monoglycerides, Myverol 18-00, Distillation Products Industries, Division of Eastman Kodak Company.

EXAMPLES 6, 7, 8 AND 9

A summary of Examples 6, 7, 8 and 9 is presented in Table B. The general procedure of Example 1 was again followed with the exceptions noted. In this series of tomato paste and tea concentrate drying runs, the effect of heating the high velocity air blown over the belt above the steam box is illustrated. Essentially a doubling in drying rates is obtained using the heated air.

underside of the belt to provide the temperature specified. This technique provides a mechanism for lowering belt temperatures enabling the drying of especially heat sensitive materials. As may be expected with a lowering of belt temperature, drying rates are decreased somewhat. The examples further illustrate the effect of heating the high velocity air above the belt, which increases the drying rate substantially without increasing the belt temperature.

*Table B*

| Example | 6 | 7 | 8 | 9 |
|---|---|---|---|---|
| Product | Commercial Tomato Paste. | Commercial Tomato Paste. | Filled Tea Concentrate. | Filled Tea Concentrate. |
| Product Solids, Percent in Foam Mat | 30 | 30 | 54 | 54. |
| Foam Stabilizer | Polyglycerol Stearate | Polyglycerol Stearate | Sucrose Monopalmitate. | Sucrose Monopalmitate. |
| Stabilizer Level, Percent of Solids | 0.6 | 0.6 | 1.0 | 1.0. |
| Foam Density, gm./cc | 0.50 | 0.49 | 0.21 | 0.21. |
| Mixer | Upright | Upright | Continuous Foamer | Continuous Foamer. |
| Foam, Height, mils | 25 | 25 | 20 | 20. |
| Dryer Designation | Steam Box | Steam Box | Steam Box | Steam Box. |
| Drying Conditions: | | | | |
| a. Steam Pressure (steam box) | 5 p.s.i.g | 5 p.s.i.g | 4 p.s.i.g | 4 p.s.i.g |
| b. Air Temp., °F. (above belt) | 85 | 185 | 85 | 170. |
| c. Belt Temp., °F | 195 | 195 | 200 | 200. |
| Residence Time, sec | 225 | 115 | 34 | 24. |
| Pounds Dry Product/(ft.²) (hr.) | 0.34 | 0.70 | 1.35 | 1.90. |

*Table C*

| Example | 10 | 11 | 12 | 13 |
|---|---|---|---|---|
| Product | Commercial Tomato Paste. | Commercial Tomato Paste. | Filled Tea | Filled Tea. |
| Product Solids, Percent | 30 | 30 | 54 | 54. |
| Foam Stabilizer | Polyglycerol Stearate | Polyglycerol Stearate | Sucrose Monopalmitate | Sucrose Monopalmitate. |
| Stabilizer Level, Percent of Solids | 0.75 | 0.75 | 1.0 | 1.0. |
| Foam Density, gm./cc | 0.45 | 0.45 | 0.30 | 0.30. |
| Mixer | Upright | Upright | Continuous Foamer | Continuous Foamer. |
| Foam Height, mils | 25 | 25 | 20 | 20. |
| Dryer Designation | Steam Box | Steam Box | Steam Box | Steam Box. |
| Drying Conditions: | | | | |
| a. Steam Pressure (steam box) | 8 p.s.i.g | 8 p.s.i.g | 8 p.s.i.g | 8 p.s.i.g. |
| b. Air Pressure (steam box) | 2 p.s.i.g | 2 p.s.i.g | 1.5 p.s.i.g | 1.5 p.s.i.g. |
| c. Air Temp., °F. (above belt) | 85 | 150 | 85 | 175. |
| d. Belt Temp., °F | 155 | 155 | 160 | 160. |
| Residence Time, sec | 580 | 150 | 80 | 56. |
| Pounds Dry Product/(ft.²) (hr.) | 0.12 | 0.43 | 0.70 | 1.0. |

EXAMPLES 14, 15 AND 16

Example 14 summarized in Table D below illustrates dehydration of tomato paste employing a combination of steam box with high velocity heated air on the top strand of the moving belt and air tunnel drying on the bottom pound of dry product per square foot of dryer area per hour. The less efficient form of drying, employing the air tunnel only as a heated oven is illustrated in Example 16. The drying rate is substantially less than with steam box dryers.

Table D

| Example | 14 | 15 | 16 |
|---|---|---|---|
| Product | Commercial Tomato Paste | Commercial Tomato Paste | Commercial Tomato Paste. |
| Product Solids, percent | 30 | 30 | 30. |
| Foam Stabilizer | Polyglycerol Stearate | Polyglycerol Stearate | Polyglycerol Stearate. |
| Stabilizer Level, Percent of Solids | 0.75 | 0.75 | 0.75. |
| Foam Density, gm./cc | 0.52 | 0.52 | 0.54. |
| Mixer | Upright | Upright | Upright. |
| Foam Height, mils | 25 | 25 | 20. |
| Dryer Designation | Steam Box and Air Tunnel | Steam Box | Air Tunnel (used as oven). |
| Drying Conditions: | | | |
| a. Steam Pressure (steam box) | 5 p.s.i.g | 5 p.s.i.g | |
| b. Air Temp. °F. (above belt) | 175 | 175 | |
| c. Belt Temp. °F. (above steam box) | 195 | 195 | |
| d. Air Temp., °F. (air tunnel) | 150 | | 200. |
| Residence Time, sec. (steam box) | 30 (to 10% moisture) | 60 (to 3% moisture) | |
| Residence Time, sec. (air tunnel) | 60 (to 3% moisture) | | 230 (to 3.0% moisture). |
| Combined Drying Time, sec | 90 | 60 | 230. |
| Overall Drying Rate (Pounds Dry Product/(ft.$^2$)(hr.)) | 0.82 | 1.0 | 0.29. | return strand. In this case the product was dehydrated to 10% moisture in 30 seconds by steam box-high velocity air top strand drying and further dehydrated to 3% moisture in another 60 seconds, by air tunnel return strand drying. The combined drying time was 90 seconds with an overall drying rate of 0.82 pound of dry product per square foot of dryer area per hour. For comparison,

EXAMPLES 17, 18 AND 19

These examples, with variations noted, follow the general procedure of Example 1. Data in Table E, are illustrative of additional alternate stabilizers which may be employed with tomato paste.

Table E

| Example | 17 | 18 | 19 |
|---|---|---|---|
| Product | Commercial Tomato Paste | Commercial Tomato Paste | Commercial Tomato Paste. |
| Product Solids, Percent | 30 | 30 | 30. |
| Foam Stabilizer | Diacetyl tartaric acid ester of Glycerol Monostearate.[1] | (A) Gunther D-100 Soy Protein [2] and (B) Methocel 65 HG, 4,000 cps.[3] | (A) Methocel MC 10 cps [4] and (B) Methocel 65 HG, 4,000 cps. |
| Stabilizer Level, Percent of Solids | 0.75 | 2 (1A + 1B) | 1.8 (0.45A+1.35B). |
| Foam Density, gm./cc | 0.45 | 0.60 | 0.54. |
| Mixer | Upright | Upright | Upright. |
| Foam Height, mils | 15 | 30 | 15. |
| Dryer Designation | Steam Box | Steam Box | Steam Box. |
| Drying Conditions: | | | |
| a. Steam Pressure (steam box) | 5 p.s.i.g | 5½ p.s.i.g | 5½ p.s.i.g. |
| b. Air Temp., °F. (above belt) | 150 | 150 | 150. |
| c. Belt Temp., °F | 195 | 195 | 190. |
| Residence Time, sec | 20 | 115 | 45. |
| Pounds Dry Product/(ft.$^2$)(hr.) | 2.0 | 0.70 | 1.0. |

[1] Witco Chemical Co., New York, New York.
[2] Gunther Products Inc., Galesburg, Ill.
[3] Hydroxypropyl methylcellulose with methoxyl content of 27–29% and a hydroxypropyl content of 5.5–7.5%, Dow Chemical Company.
[4] Methylcellulose with a methoxyl content of 27.5 to 32%, Dow Chemical Company.

Examples 15 and 16 utilizing steam box drying only and air tunnel drying only are summarized. In Example 15, the more expensive steam box-high velocity air drying unit was used for the total drying to 3% moisture. This was accomplished in 60 seconds with a drying rate of 1.0

EXAMPLES 20–27

In Table F, a summary of results obtained with Examples 20 through 27 in which various alternate foodstuffs are dried, is presented. The procedure is generally that described in Example 1 with the variations noted.

Table F

| Example | 20 | 21 | 22 | 23 |
|---|---|---|---|---|
| Product Concentrate | Filled Tea | Pure Tea | Tomato Juice | Applesauce. |
| Product Solids, Percent | 54 | 40 | 25 | 12.5. |
| Foam Stabilizer | Sucrose Monopalmitate | Sucrose Monopalmitate | Polyglycerol Stearate | Egg White. |
| Stabilizer Level, Percent of Solids | 1 | 0.5 | 0.6 | 1.5. |
| Foam Density, gm./cc | 0.28 | 0.22 | 0.53 | 0.59. |
| Mixer | Upright | Upright | Upright | Upright. |
| Foam Ht., mils | 30 | 30 | 30 | 30. |
| Dryer Designation | Steam Box | Steam Box | Steam Box | Steam Box. |
| Drying Conditions: | | | | |
| a. Steam Press. (steam box) | 4½ p.s.i.g | 4½ p.s.i.g | 4½ p.s.i.g | 5 p.s.i.g. |
| b. Air Temp., °F. (above belt) | 150 | 150 | 150 | 150. |
| c. Belt Temp., °F | 195 | 195 | 195 | 195. |
| Residence Time, sec | 38 | 50 | 140 | 105. |
| Pounds Dry Product/(ft.$^2$)(hr.) | 1.8 | 1.0 | .44 | .56. |

Table F—Continued

| Example | 24 | 25 | 26 | 27 |
|---|---|---|---|---|
| Product Concentrate | Orange Juice | Unsweetened Grape Juice | Unsweetened Grapefruit Juice | Pineapple Juice. |
| Product Solids, Percent | 60 | 48 | 52 | 52. |
| Foam Stabilizer | (A) Gunther D-100 Soy Protein and (B) Methocel 65 HG, 4,000 cps. | (A) Gunther D-100 Soy Protein and (B) Methocel 65 HG, 4,000 cps. | (A) Gunther D-100 Soy Protein and (B) Methocel 65 HG, 4,000 cps. | (A) Gunther D-100 Soy Protein and (B) Methocel 65 HG, 4,000 cps. |
| Stabilizer Level, Percent of Solids | 1.0 (0.5A+0.5B) | 4.0 (2A+2B) | 1.0 (0.5A+0.5B) | 1.0 (0.5A+0.5B). |
| Foam Density, gm./cc | 0.37 | 0.25 | 0.35 | 0.32. |
| Mixer | Upright | Upright | Upright | Upright. |
| Foam Ht., mils | 15 | 30 | 20 | 20. |
| Dryer Designation | Steam Box | Steam Box | Steam Box | Steam Box. |
| Drying Conditions: | | | | |
| a. Steam Pressure (steam box) | 1.5 p.s.i.g | 5 p.s.i.g | 1.5 p.s.i.g | 1.5 p.s.i.g. |
| b. Air Temp., °F. (above belt) | 150 | 150 | 150 | 150. |
| c. Belt Temp., °F | 195 | 195 | 195 | 195. |
| Residence Time, sec | 85 | 102 | 94 | 92. |
| Pounds Dry Product/(ft.²)(hr.) | 0.60 | 0.56 | 0.60 | 0.64. |

EXAMPLE 28

One of the many advantages of multi-zone temperature control is illustrated in the following example.

Two runs were made utilizing a two-zone steam box dryer to dry commercial grape juice concentrate foamed by the method of Example 25. In the first run, the foam was dried with both steam boxes controlled to produce a belt temperature of 195° F. with an air temperature of 150° F. The product which was adjacent to the belt fused after it was dry, but before the entire layer was dry and reconstitution of the dried powder was poor (many undispersed lumps remained after extended stirring of the dried product in tap water at about 45° F.) because of the fusion which destroyed the foam structure.

In the second run, the upstream zone of the dryer was controlled to the same temperature as in the first run. However, the second zone was now operated to produce a belt temperature of 160° F. instead of 195° F. The product introduced into the second zone had a moisture content of about 15% and an exit moisture of about 3%. No fused layer of product was observed and the powder reconstituted readily and completely into juice which compared favorably with the starting material.

EXAMPLE 29

Judicious use of the temperature control afforded by the existence of separate zones will often times afford an increase in production rate without a decrease in product quality. Thus, orange juice, foamed as in Example 24 and cast at a foam layer height of 15 mils, was dried in a two zone dryer. The steam boxes were regulated so as to provide a belt temperature of 195° F. through both zones. The air temperature over the product in the first zone was 225° F. and in the second zone it was 150° F. The layer introduced into the second zone had moisture of about 12%. The unit production rate was 0.73 lb./(hr.)(ft.²) of dry product compared to 0.60 lb./(hr.)(ft.²) obtained in Example 24; an increase of more than 20%. Even though the temperature in the dryer was higher, the dried products were accepted favorably and judged to be equivalent by a qualified panel, to the product of Example 24.

EXAMPLE 30

The experiment of Example 29 was repeated with the exception that nitrogen gas to provide an inert atmosphere and heated to 150° F. was used in place of air in the second zone of the dryer. A similar production rate was obtained, but the product was judged to be superior in taste and color to that produced in Example 29.

EXAMPLE 31

As illustrated by this example, the invention is not limited to aqueous systems or to food products.

A solution of a solvent soluble methylcellulose in a mixed solvent of benzene-methanol (80:20) is obtained in the final purification step of the methylcellulose manufacturing process. A sample of this solution was foamed using 1% by weight of propylene glycol stearate based on the weight of solids. The foam was cast at a slit height of 30 mils and dried with ambient air at 1000 ft./min., the steam box was controlled to produce a belt temperature of 145° F. The solvent-free product was of good color and was readily resoluble in the starting solvent. The dried product was free-flowing and had clearly discernable porous structure.

EXAMPLE 32

The moisture content of the dried products normally produced by this process is in excess of 1%. In some instances it may be desirable to obtain moistures below this level. A convenient method which avoids damage from extended drying times or excessive temperature is to dry the product to the point where damage has not occurred, i.e. about 2–3%, and then to remove the remainder of the water as a minimum boiling azeotrope. This may be readily accomplished by cooling the belt coming out of the dryers, spraying onto the layer an azeotroping agent such as ethyl alcohol and then redrying the foam in an additional zone. For example, orange juice was foamed and cast as in Example 24. It was dried to 3% water in a drying zone maintained at a belt temperature of 195° F. with an air temperature of 150° F. As the belt left the zone, it was cooled by spraying cold water on the underside of the belt. The belt then passed through a spray booth where ethyl alcohol was sprayed onto the foam. The solvent content of the foam was 50% (wet basis) at the exit of the spray booth. The belt then travelled through a second drying zone maintained at the same conditions as the first. The moisture content of the product at the outlet of the dryer was 0.4%. When a similar foam was processed through this equipment in the same residence time, but without the use of the belt cooler or the alcohol spray, the moisture content of the product was 1.8%. No difference in flavor between the two products was detected.

It will be apparent to those skilled in the art that various modifications may be made in the invention without departing from the scope of the invention. Accordingly, the invention is not to be limited except insofar as necessitated by the appended claims.

We claim:

1. A method of dehydrating a foam which comprises depositing a layer of said foam upon a moving impervious metallic conveyor belt, passing a heated gas over said foam, impinging steam at the underside of said belt and continuing said dehydration until the moisture in said foam is substantially reduced.

2. The method of claim 1 in which at least the terminal portion of the dehydration of said foam is conducted under a desiccated gas.

3. The method of claim 1 in which at least the terminal portion of the dehydration of said foam is conducted under an inert gas.

4. The method of claim 1 wherein the steam impinged at the underside of said drying surface is admixed with air at atmospheric pressure.

5. The method according to claim 1 including the step of passing the return direction of said conveyor belt carrying the partially dehydrated adhering foam thereon through a heated air tunnel to remove additional moisture.

6. A method of dehydrating a foam which comprises depositing a layer of said foam, in thicknesses not exceeding about 100 mils, upon a moving impervious metallic conveyor belt, passing a drying gas over said foam in a direction transverse to the movement of said belt, impinging steam at the underside of said drying surface and continuing said dehydration until the moisture in said foam is substantially reduced.

7. The method according to claim 5 wherein the heated gas is passed over said foam in a plurality of separate zones.

8. The method according to claim 6 wherein the heated gas has a relative velocity with respect to the foam layer of between 300 and 2000 feet per minute.

9. The method of claim 6 in which the impingement and condensation of steam on the underside of the belt is effected in a plurality of distinct zones.

References Cited by the Examiner

UNITED STATES PATENTS

| | | | |
|---|---|---|---|
| 1,232,446 | 7/1917 | Haughey | 71—26 |
| 1,286,538 | 12/1918 | Coleman | 159—7 |
| 1,324,758 | 12/1919 | Baker | 34—208 |
| 2,301,589 | 11/1942 | Shepard | 34—236 |
| 2,365,519 | 12/1944 | Bloedorn | 99—188 |
| 2,429,964 | 10/1947 | Shopmeyer et al. | 127—34 |
| 2,592,902 | 4/1952 | Hurst | 34—236 |
| 2,800,726 | 7/1957 | Koch et al. | 34—208 |
| 2,812,018 | 11/1957 | Heald et al. | 159—7 X |
| 2,884,705 | 5/1959 | Flynn | 34—155 X |
| 2,934,441 | 4/1960 | Morgan et al. | 99—201 |
| 2,955,046 | 10/1960 | Morgan et al. | 99—206 |
| 2,955,943 | 11/1960 | Morgan et al. | 99—206 |
| 2,967,109 | 1/1961 | Morgan et al. | 99—206 |
| 2,976,158 | 3/1961 | Morgan et al. | 99—199 |
| 2,981,629 | 4/1961 | Ginnette et al. | 99—206 |
| 3,031,313 | 4/1962 | Morgan et al. | 99—206 |
| 3,057,739 | 10/1962 | Forkner | 99—204 |
| 3,066,030 | 11/1962 | Eolkin | 99—204 |
| 3,134,653 | 5/1964 | Justus et al. | 34—160 X |

NORMAN YUDKOFF, *Primary Examiner.*

GEORGE D. MITCHELL, *Examiner.*

J. SOFER, *Assistant Examiner.*